Nov. 17, 1959     A. R. WILLIAMS     2,913,072
BRAKE CONTROL SYSTEM

Filed Aug. 20, 1957     2 Sheets-Sheet 1

INVENTOR
ALLISON R. WILLIAMS
BY Cameron, Kerkam & Sutton
ATTORNEYS

Nov. 17, 1959  A. R. WILLIAMS  2,913,072
BRAKE CONTROL SYSTEM
Filed Aug. 20, 1957  2 Sheets-Sheet 2

INVENTOR
ALLISON R. WILLIAMS.
BY Cameron, Kerkam & Sutton
ATTORNEYS

United States Patent Office 2,913,072
Patented Nov. 17, 1959

2,913,072

BRAKE CONTROL SYSTEM

Allison R. Williams, Vicksburg, Miss.

Application August 20, 1957, Serial No. 679,550

9 Claims. (Cl. 188—181)

This invention relates to means for controlling the deceleration of a rotating body by an absolute value comparison of the rate of decrease of its angular velocity (i.e., its actual angular deceleration) with the rate of decrease of its linear velocity (i.e., its linear deceleration). This application is a continuation-in-part of my prior application Serial No. 618,815, filed October 29, 1956.

The invention will be described hereinafter with particular reference to the control of the braking effort applied to aircraft landing wheels so as to minimize or prevent locking of a wheel and consequent skidding rather than rolling contact of the tire with the runway surface. It has been proposed heretofore to control airplane wheel braking by an inertia member rotating with or driven from part of the wheel itself. The inertia member is usually held in a neutral position relative to the wheel (i.e., rotating therewith) by suitable friction means, springs, or the like, but is angularly displaced relative to the wheel when the deceleration of the wheel increases beyond a predetermined value empirically set depending on the fraction or spring setting. This degree of overrun of the inertia member is utilized to close an electric circuit and to energize means whereby the braking effort is temporarily relieved, partially or wholly. In such systems, the overrun of the inertia member for any spring setting is a function of the actual angular deceleration of the wheel.

My prior Patent No. 2,529,885, granted November 14, 1950, discloses a more accurate brake control system in which the actual angular deceleration of the wheel is compared with the linear deceleration of the wheel. The application of the brakes results in a deceleration of the forward movement of a moving vehicle such as an airplane, or in other words a linear deceleration of the vehicle body. As long as the vehicle body and wheels are so connected that no relative linear movement takes place between them, the wheels will of course have the same linear deceleration as the vehicle body. In some cases, however, as in the case of aircraft where the landing gear struts are in effect vertical cantilever beams, or where the wheel suspension is resilient or somewhat flexible, the wheel may have linear movement relative to the body due for example to rearward deflection of the struts on landing or yielding of the resilient suspension. Under such circumstances the actual linear deceleration of the wheel differs from that of the vehicle body, and the references hereinafter to linear deceleration should be understood to refer to that of the wheel itself where different from that of the vehicle body.

Assuming that the vehicle wheel maintains the ideal conditions of complete rolling contact with the supporting surface without slippage, the linear deceleration and loss of linear velocity of the wheel must be accompanied by corresponding and directly proportional angular deceleration and loss of angular velocity of the wheel. Thus it will be seen that the linear deceleration of the wheel provides an accurate standard of reference against which the actual angular deceleration of the wheel can be compared to determine how closely its actual performance approaches the ideal.

In practice under some combinations of circumstances the simpler control first mentioned is reasonably satisfactory, but under others it falls short of what is desired. In landing airplanes, for example, the landing roll has lengthened to the point where maximum braking is needed, yet the skid problem has become greater at the same time. In landing, wheel load conditions vary from little or no contact to full aircraft weight and the optimum brake pressure varies over a correspondingly wide range. The problem is further complicated by wheel bounce, cross wind landings where one or more wheels may be off the ground for considerable distances, wet or icy runways, etc. Even under normal or ideal conditions, much less under such widely varying conditions, the wheels themselves cannot be relied upon as a reference for adequate control of the braking effect thereon for slip control.

In the usual fluid pressure brake system, the braking effect is easily controllable by regulating the brake-operating pressure. Thus a suitable valve can be installed in the brake pressure line and operated either electrically or mechanically to relieve the brake pressure. The valve in turn can be operated in response to an absolute value comparison between the angular overrun of an inertia fly-wheel, or in other words its angular displacement relative to the wheel, and the linear deceleration of the wheel as determined by a linear decelerometer of any suitable type, preferably a seismic mass. The comparison can be effected in various ways. For example, the prior patent mentioned above discloses the comparison of electromagnetic forces proportional respectively to the angular deceleration and the linear deceleration of the wheel, and the present invention relates particularly to devices of this type.

The angular deceleration of the wheel for any given linear deceleration is a function of the wheel radius and hence depends to some extent on the degree of depression of the tires. When an airplane becomes completely landborne and the tires are depressed to the maximum by the supporting surface or runway, the effective wheel radius is decreased and therefore the angular deceleration for any given linear deceleration is increased. In a comparison-type control system in which an electromotive force or current proportional to angular deceleration is compared with another force or current proportional to linear deceleration, compensation for such variations in effective wheel radius can be effected by the use of a variable resistance responsive to changes in effective wheel radius and suitably connected either with the circuit responsive to angular deceleration or with the circuit responsive to linear deceleration, said resistance being arranged so that the resistance increases in the angular deceleration circuit or decreases in the linear deceleration circuit as the effective wheel radius decreases. In case one force is mechanical, as in the case of a linear decelerometer of the seismic type, the desired compensation can be secured by augmenting or decreasing the inertia forces acting on the seismic mass by electromagnetic means similarly controlled.

Several embodiments of the invention are illustrated in the accompanying drawings but it is to be expressly understood that said drawings are for purposes of illustration only and are not to be construed as a definition of the limits of the invention, reference being had to the appended claims for this purpose.

It will be understood that in angular decelerometers embodying the invention the inertia member is preferably small and light weight and is mounted coaxially with the wheel itself. Also the linear decelerometer, where used, is preferably carried by the wheel itself so as to be responsive to the actual linear deceleration of the wheel itself. Many conventional landing wheel constructions employ hollow non-rotating axles on which the wheels are rotatably mounted and such tubular axles provide convenient mountings and housings for the control elements of the invention. For convenience, the drawings show installations of this type, but it will be understood that any other suitable structural arrangement can be employed.

Figure 1:
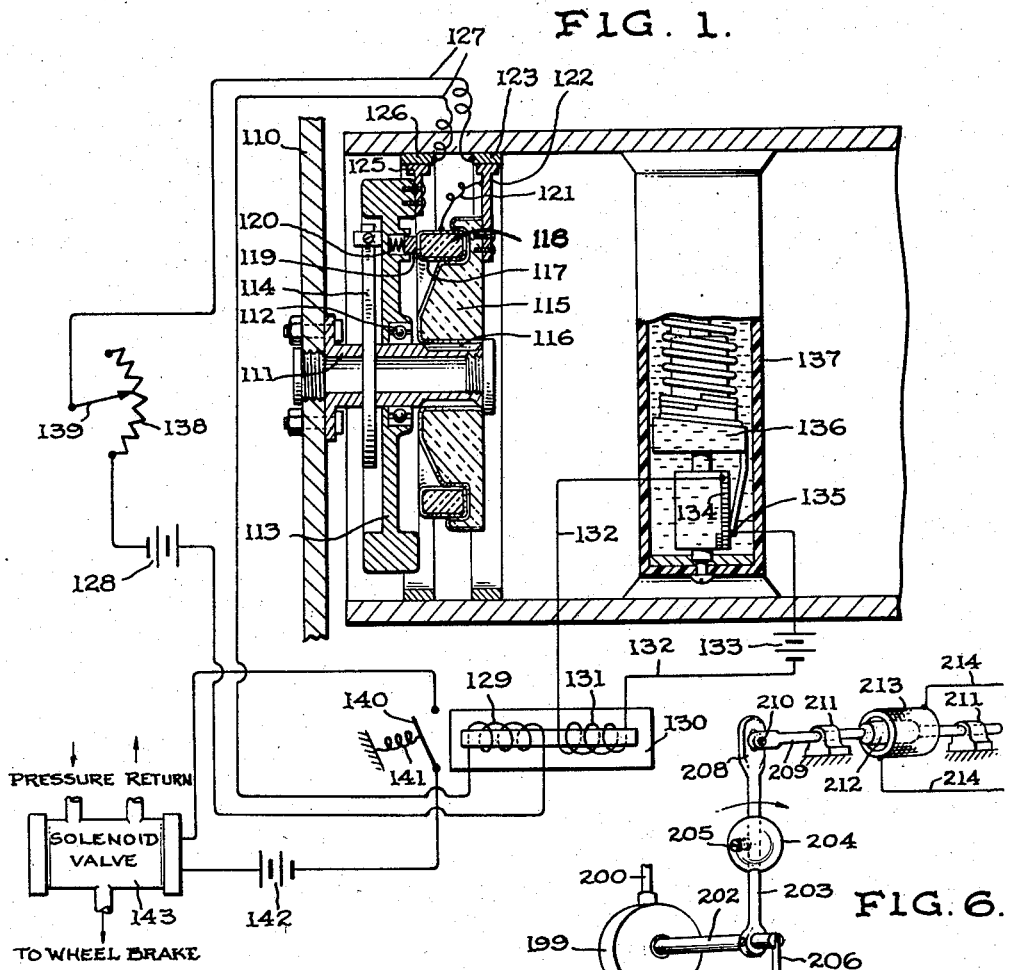
Fig. 1 shows by way of example one form of angular decelerometer together with a linear decelerometer and means for generating and comparing electromotive forces proportional to the two decelerations, a variable resistance responsive to changes in wheel radius being shown in the circuit responsive to angular deceleration.

Fig. 1 illustrates the use of a rotary inertia member of the type described above to obtain an electric current proportional to angular deceleration which is compared with a current proportional to linear deceleration in a control system of the second type mentioned above. The wheel spider 110, the stub shaft 111, and the bearing 112 provide a rotating assembly within the end of the wheel axle which rotates with the wheel relative to the axle. The rotary inertia member 113 is connected by the spring 114 with the stub shaft 111 so as normally to rotate with the aforesaid assembly and the wheel. The end of the hollow stub shaft 111, however, carries a rotor 115, preferably of insulating material, which is keyed to the stub shaft at 116. Adjacent the periphery of the rotor 115 is an annular resistor 117 wound on a suitable core 118, preferably of insulating material. A contact 119 is carried by the inertia member 113 and is pressed outwardly by a spring 120 into sliding engagement with the resistor 117. Any suitable slip ring arrangement can be employed to connect the rotating contact 119 and resistor 117 with non-rotating parts outside the axle. It is generally preferred to use slip rings of as small diameter as possible, but for simplicity of illustration in the present case, one end of the resistor has been shown diagrammatically as being connected by a wire 121 and brush 122 with a slip ring 123 on the inside of the hollow wheel axle, whereas a brush 125 connects the contact 119 with a second similar slip ring 126.

It will be seen accordingly that the amount of resistance between the slip rings 123 and 126 is a function of the angular displacement of the rotary inertia member 113 relative to the wheel spider 110. This resistance is inserted in series with a circuit formed by leads 127 and containing a suitable source of energy 128, said circuit being connected to one energizing coil 129 of a differential relay 130. The other coil 131 of said relay is energized by a circuit 132 containing a suitable source of energy 133 and having in series a portion of a resistance 134, the amount of such resistance depending upon the position of a sliding contact 135 carried by the seismic mass 136 of a linear decelerometer 137.

Since variations in the effective radius of the wheel affect angular deceleration of the wheel as explained above, it may be desired in the case of comparison-type controls such as illustrated by Fig. 1 to insert a compensating variable resistance in the circuit responsive to angular deceleration. Such an arrangement is illustrated by Fig 1 wherein one of the leads 127 contains a compensating rheostat in the form of a variable resistance 138 and a movable contact 139. The rheostat 138, 139 may be of any of the types shown hereinafter in Figs. 2, 3, and 4.

If desired, of course, the sources of energy 128, 133 and 142 may be connections to a common source instead of separate sources.

It will be seen that as long as the electromagnetic forces set up by the coils 129 and 131 are equal and opposite, there will be no effect on the switch 140 which will be held open by its spring 141. Whenever the current in the winding 129, as adjusted by the compensating resistance 138, becomes proportionately larger than that in the coil 131, however, the switch 140 is closed and its circuit which contains a source of energy 142 energizes the operating coil of the solenoid valve 143 to regulate the braking pressure as described above.

Figure 2:
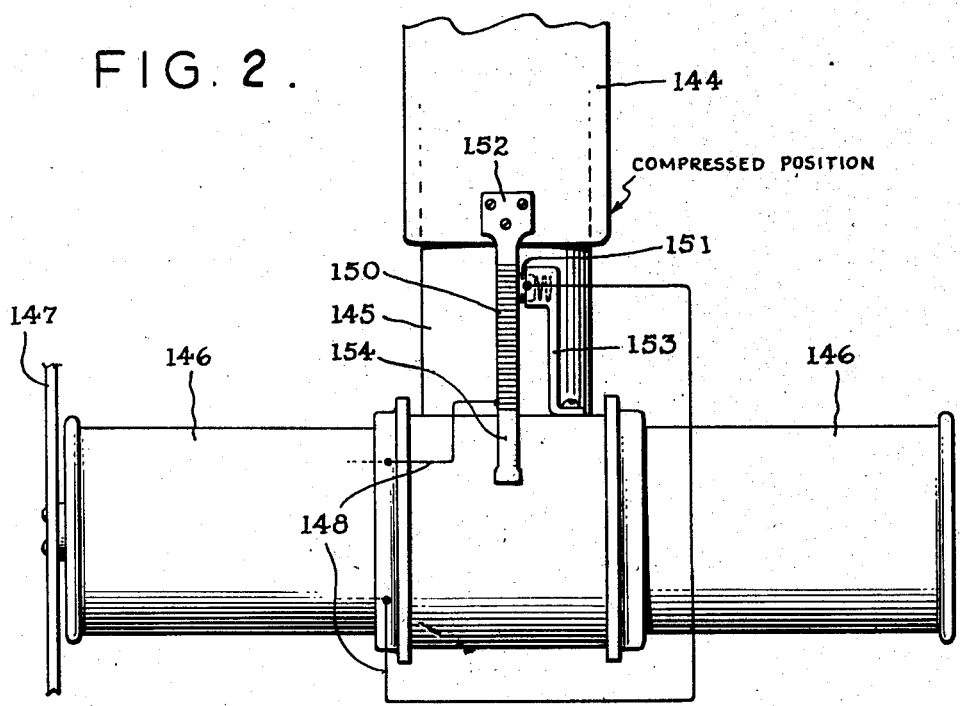
Figs. 2, 3 and 4 illustrate different ways of using a variable resistance to compensate for changes in effective wheel radius.
Figure 3:
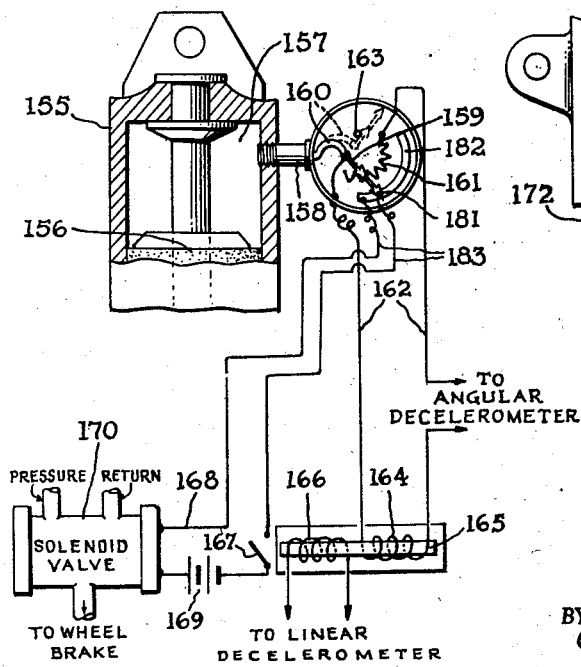
Figure 4:
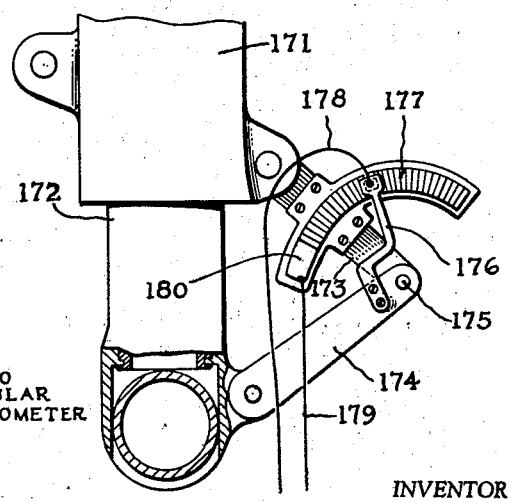

Variable resistances compensating for variations in the effective radius of a wheel can be used in any comparison-type control circuit the current in which is controlled or regulated in response to angular or linear deceleration of the wheel. It will be understood that Fig. 1 is only one illustration of such a system, others being found in my prior patent and in my prior pending application. Figs. 2, 3 and 4 illustrate suitable methods of operating such compensating variable resistances. By way of example, these figures show telescoping strut members 144 and 145 between which any suitable cushioning mechanism may be interposed. The strut member 145 carries horizontal and transverse axle members 146 which as shown are of the usual hollow tubular variety, one of these axle members being shown provided with a wheel spider 147 as described above. A control mechanism such as shown in Fig. 1 is housed within the axle 146 as described above, and part of the circuit controlled by the means responsive to angular deceleration (circuit 127 in Fig. 1) emerges from the hollow axle in any suitable way, as by means of leads 148. The compensating resistance is connected in series in the circuit 148 and comprises a linear resistance element 150 suitably mounted on the strut member 144 and a spring pressed contact 151 having sliding engagement with the resistance element and carried in any suitable manner by the other strut member 145. Fig. 2 shows the strut elements in telescoped or compressed position in which the contact 151 has moved upwardly along the resistance 150 to include maximum or nearly maximum resistance in the circuit 148 as described above.

It will be understood that the structural details shown in Fig. 2 may be varied as desired. For convenience, the resistor 150 has been shown mounted on the lower end of strut part 144 by means of a head 152 whereas the contact 151 has been shown as carried by a bracket 153 secured to the lower end of the strut part 145. Preferably also the resistance element 150 and contact 151 are arranged to open the circuit 148 when the airplane is air borne and the strut is fully extended. At such times the contact 151 moves down and off the resistance 150 and comes into engagement with the non-conductive end portion 154 thereof.

Fig. 3 illustrates another arrangement in which the compensating rheostat or variable resistance is pneumatically operated by the pressure created in the air dome of the shock strut on landing. Only the upper part of the strut is shown, comprising an outer part or casing 155 and an inner piston-like member 156 sliding therein. The pneumatic pressure created in the dome 157 on compression of the strut is transmitted through the conduit 158 to a suitable pneumatically operated rheostat. For example, a rotatable contact member 159 is operated by a Bourdon-type tube 160 connected to the pipe 158 and traverses a circularly arranged resistance 161. This resistance is connected in series in the circuit 162 of the desired angular decelerometer device such as that shown in Fig. 1. When the strut is fully extended, the arm 159 is moved off the resistance against a stop 163 and the circuit 162 is open. When the aircraft lands, however, the circuit 162 energizes one coil 164 of a differential relay 165, the energizing current depending on the position of the contact arm 159 and also on the rate of angular deceleration. The other coil 166 of the relay is connected to a linear decelerometer as explained above in connection with Fig. 1, the energizing current being proportional to linear deceleration. When the coil 164 overcomes the coil 166, the switch 167 closes and its circuit 168 containing the source of energy 169 energizes the operating coil of a solenoid valve 170 to regulate the pressure in the brake line.

Fig. 4 shows still another arrangement of variable resistance which can be used in the manner shown in Figs. 2 and 3. The telescoping strut parts 171 and 172 carry pivotally mounted links 173 and 174 respectively, the links being pivotally connected at their outer ends 175. As the strut is compressed on landing, therefore, the angle between the links 173 and 174 is decreased causing the contact arm 176 of the link 174 to move relatively to the resistance sector 177 carried by the link 173 and thus to incorporate an increasing amount of resistance in the circuit 178, 179. When the strut is fully extended, however, the contact arm 176 moves off the resistance and engages a non-conductive end 180 of the sector 177 to open the circuit 178, 179 as described in connection with Figs. 2 and 3.

It may be desired also to open the valve-operating circuit when the aircraft is air borne, such as the circuit 140, 142, 143 of Fig. 1, the circuit 168 of Fig. 3, etc. This may be accomplished readily by a switch operated by the compression and extension of the landing wheel strut, and such a switch may be either separate from or operated along with a compensating variable resistance when one is employed. For example, in Fig. 3 the contact arm 159 is extended beyond the resistance 161 and carries an insulated contact 181 which slides over a conductive section 182. Contact 181 and sector 182 are inserted in series in the circuit 168 by leads 183. When the aircraft is air borne and the arm 159 bears against stop 163, the contact 181 does not engage the sector 182 and the circuit 183, 168 is open. At touch down, however, the initial compression of the strut swings the arm 159 until the contact 181 and sector 182 engage to close the circuit. It will be understood that a similar switch mechanism can be operated according to Fig. 2 or Fig. 4.

Figures 5, 6:
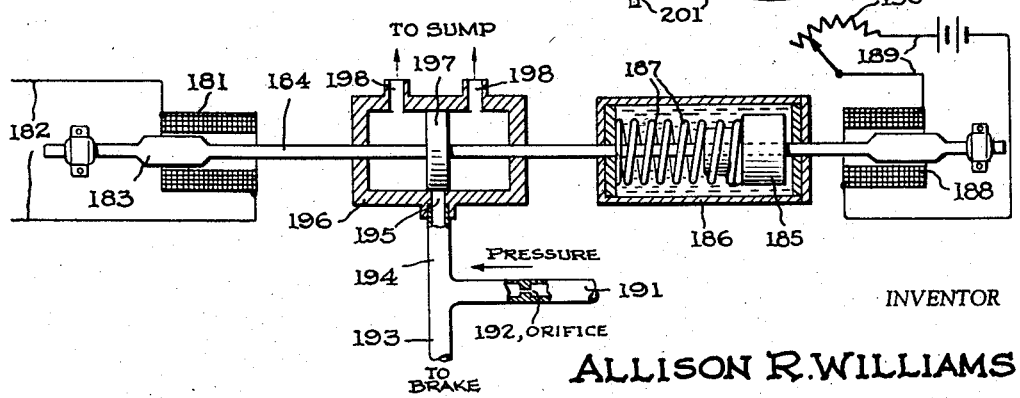
Figs. 5 and 6 show embodiments in which seismic masses are acted upon by electromagnetic means responsive to changes in wheel radius in such a way as to vary the inertia effects.

Fig. 5 shows part of another comparison-type control system wherein the electromagnetic coil 181 is connected in a circuit 182 carrying a current proportional to angular deceleration; this circuit may for example be like the circuit 127 of Fig. 1. The coil 181 acts on an armature 183 on a valve stem 184 and tends to move the valve stem to the right as seen in Fig. 5. This tendency is normally balanced by the seismic mass 185 of a linear decelerometer 186 arranged so that the mass 185 tends to move the valve stem 184 to the left in opposition to the coil 181. The mass 185 may be controlled by a suitable spring 187.

Since as explained above, the effect of the coil 181 increases as the effective radius of the wheel decreases, compensation may be effected by increasing correspondingly the inertia forces acting on the mass 185. For example, an electromagnetic coil 188 acts on the valve stem 184 to assist the inertia of the mass 185. The coil is energized by any suitable circuit 189 containing a variable resistance 190 which may be like any of those shown in Figs. 2, 3 and 4 except that it is connected to insert the maximum resistance in the circuit when the tire is fully extended. As the tire is compressed, angular deceleration and the effect of coil 181 increase, but at the same time the resistance 190 is adjusted to increase also the current in circuit 189 and the effect of coil 188.

Fig. 5 also illustrates another valve arrangement not claimed herein but preferred in many cases where completely foolproof systems are necessary. Brake pressure is supplied through line 191 and orifice 192 and operates the brakes through line 193. A bypass 194 leads to an inlet opening 195 in a valve casing 196, said opening being normally closed by a piston 197 on the valve stem 184. On any deviation from balanced condition, the valve stem moves in one direction or the other and opens the port 195 to bleed the operating pressure to either one of two ports 198 both connected to the sump. Thus the brake pressure is relieved in any case of unbalanced forces on the valve stem, regardless of the direction of the unbalanced force and the consequent direction of movement of the valve stem 184 and piston 197.

It will be understood, of course, that opposed forces of the type described above can be utilized to control any suitable type of longitudinally movable or rotary valve through the use of mechanical connections of various kinds. Further the seismic mass effect is not restricted to a mass mounted on and movable with the valve stem, but can be created for example by a pendulum-like mass suitably connected to the valve, inertia-controlled valves of this type being known in the art. By way of example, Fig. 6 shows diagrammatically a rotary valve 199 having an inlet connection 200 corresponding to the bypass 194 of Fig. 5, and two outlets 201 leading to the sump in the manner of the outlets 198 of Fig. 5. Mounted on the valve stem 202 is an arm 203 carrying a seismic mass 204 in the nature of a pendulum bob, the position of which on the pendulum arm 203 can be adjusted by means of a set screw 205. In response to linear deceleration of the wheel, the mass 204 tends to rotate the valve stem 202 in a clockwise direction as seen in Fig. 6 against a suitable yielding resistance such as a leaf spring 206 having one end secured to the valve stem, the spring extending radially from the valve stem and having its other end held in a suitable anchor 207 fixed for example to the wheel axle.

It will be understood from the foregoing description that this tendency of the mass 204 to rotate the valve stem 202 in the direction of the arrow is opposed by a torque responsive to angular deceleration and applied to the valve stem in any desired manner, as for example by means of a device such as that shown in the copending application of James B. Reswick and Allison R. Williams, Serial No. 665,969, filed June 17, 1957, a device of the overrunning inertia flywheel type as disclosed in my prior application Serial No. 618,815 mentioned above, or by means of an electrical angular decelerometer such as shown in my prior Patent No. 2,529,885.

Compensation for compression of the tire can be effected by use of an electromagnetic means which augments the torque of the seismic mass 204. Since the extent of rotation of the valve stem 202 is very small, the compensating torque may suitably be applied directly to the slotted head 208 of the arm 203 by means of a rod 209 having a pin 210 which engages the slotted head 208. Rod 209 is slidable in suitable bearings 211 and carries the armature 212 of an electromagnetic coil 213 energized by leads 214 of a circuit similar to 189, 190 of Fig. 5.

While the embodiments of the invention shown in the accompanying drawings have been illustrated in detail and described with considerable particularity, it will be understood that the invention is not restricted to these embodiments but is susceptible of a variety of forms which will suggest themselves to those skilled in the art. Also various changes may be made in the form, details of construction and arrangement of the parts without departing from the spirt of the invention. Reference is therefore to be had to the appended claims for a definition of the limits of the invention.

What is claimed is:

1. In a braking system for a wheeled vehicle which comprises a compressible strut and a wheel thereon having a compressible pneumatic tire, a fluid pressure-operated brake for said wheel, a valve for controlling the braking pressure, means responsive to changes in angular velocity of a wheel comprising an inertia member mounted for rotation relative to the wheel and yieldably connected with the wheel for normal rotation therewith, means responsive to changes in linear velocity of the wheel comprising a seismic mass mounted for movement relative to the wheel, means for opposing the inertia forces developed by said inertia member and seismic mass on deceleration of said wheel to obtain a resultant of said inertia forces, and means operated by a resultant of the opposed inertia forces of said inertia member and seismic mass for actuating said valve, the combination of electromagnetic means for varying one of said opposed inertia forces to compensate for decreases in the effective radius of the wheel due to compression of the tire comprising an electrical energizing circuit for said electromagnetic means, a variable resistance in said circuit, and means actuated in response to compression of the strut for varying the amount of said resistance.

2. A braking system as defined in claim 1, said electromagnetic means having an armature connected mechanically with one of said inertia member and seismic mass for varying the inertia force created thereby in response to change in wheel velocity.

3. A braking system as defined in claim 1, said electromagnetic means having an armature connected mechanically with said valve for applying a compensating force thereto.

4. A braking system as defined in claim 1, including means operated by one of said inertia member and seismic mass for regulating the current passing through said electromagnetic means in proportion to one of said inertia forces, said electromagnetic means having an armature connected with said valve.

5. A braking system for a wheeled vehicle having a fluid pressure-operated brake, the combination of a valve for controlling the braking pressure, electromagnetic means for actuating said valve having two energizing circuits connected thereto in opposition to one another, means responsive to changes in angular velocity of a wheel comprising an inertia member mounted for rotation relative to the wheel and yieldably connected with the wheel for normal rotation therewith, current-regulating means connected respectively to said wheel and inertia member and rotatable relatively to each other for varying the amount of resistance and thereby regulating the current in one of said energizing circuits, and means responsive to changes in linear velocity of the wheel for regulating the current in the other of said energizing circuits.

6. A braking system as defined in claim 5 including a compressible strut for said wheel, a variable resistance in one of said energizing circuits, and means for varying said resistance in response to compression of said strut to compensate for decrease of effective wheel radius due to tire compression.

7. A braking system as defined in claim 6, said resistance being connected in said first energizing circuit and the amount of resistance in said circuit increasing in response to decrease of effective wheel radius.

8. In a braking system for a wheeled vehicle having a compressible strut and a wheel thereon having a compressible tire, a fluid pressure operated brake for said wheel, a valve for controlling the braking pressure, electromagnetic valve-operating means having two opposed energizing circuits, means responsive to angular deceleration of a wheel and connected with one of said circuits so that the current therein is proportional to said angular deceleration, means responsive to linear deceleration of the wheel and connected with the other circuit so that the current therein is proportional to said linear deceleration, a variable resistance in one of said circuits, and means for adjusting said resistance to regulate the amount of current in said one circuit in proportion to decreases in the effective radius of the wheel due to tire compression, said adjusting means being actuated by compression and extension of said strut.

9. A braking system as defined in claim 8, said adjusting means and resistance being arranged to break said circuit responsive to angular deceleration when the wheel strut is fully extended.

References Cited in the file of this patent

UNITED STATES PATENTS 2,160,212    Canetta _____ May 30, 1939
2,529,985    Williams _____ Nov. 14, 1950